(12) United States Patent
Seong et al.

(10) Patent No.: US 9,991,480 B2
(45) Date of Patent: Jun. 5, 2018

(54) RECHARGEABLE BATTERY (71) Applicant: SAMSUNG SDI CO., LTD., Yongin-si, Gyeonggi-do (KR)

(72) Inventors: Jae-Il Seong, Yongin-si (KR); Kyong-Jin Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 110 days.

(21) Appl. No.: 14/945,457

(22) Filed: Nov. 19, 2015

(65) Prior Publication Data

US 2016/0149172 A1 May 26, 2016

(30) Foreign Application Priority Data

Nov. 26, 2014 (KR) .................. 10-2014-0166521

(51) Int. Cl.
| | |
|---|---|
| *H01M 2/04* | (2006.01) |
| *H01M 2/06* | (2006.01) |
| *H01M 2/08* | (2006.01) |
| *H01M 2/20* | (2006.01) |
| *H01M 10/42* | (2006.01) |
| *H01M 10/04* | (2006.01) |
| *H01M 2/22* | (2006.01) |

(52) U.S. Cl.
CPC ......... *H01M 2/0404* (2013.01); *H01M 2/043* (2013.01); *H01M 2/0473* (2013.01); *H01M 2/22* (2013.01); *H01M 10/0431* (2013.01)

(58) Field of Classification Search
None
See application file for complete search history.

(56) References Cited

U.S. PATENT DOCUMENTS

| 7,858,227 B2 | 12/2010 | Song et al. | |
|---|---|---|---|
| 2006/0099494 A1* | 5/2006 | Jung | H01M 2/0426 429/72 |
| 2006/0216592 A1* | 9/2006 | Chun | H01M 2/0404 429/175 |
| 2010/0068616 A1* | 3/2010 | Uh | H01M 2/0207 429/163 |
| 2013/0029211 A1 | 1/2013 | Seong et al. | |

FOREIGN PATENT DOCUMENTS

| KR | 10-2006-0037837 A | 5/2006 |
|---|---|---|
| KR | 10-2006-0118957 A | 11/2006 |
| KR | 10-2009-0062542 A | 6/2009 |
| KR | 10-2013-0014437 A | 2/2013 |

* cited by examiner

*Primary Examiner* — Yoshitoshi Takeuchi
(74) *Attorney, Agent, or Firm* — Lee & Morse P.C.

(57) ABSTRACT

A rechargeable battery, including an electrode assembly performing charging and discharging; a case containing the electrode assembly and an electrolyte solution; cap plate coupled to an opening of the case to seal the opening and containing more electrolyte solution in a receiving groove on an inner surface thereof; and an insulation case coupled to the receiving groove by a protrusion and located between the electrode assembly and the cap plate.

8 Claims, 6 Drawing Sheets

RECHARGEABLE BATTERY

CROSS-REFERENCE TO RELATED APPLICATION

Korean Patent Application No. 10-2014-0166521, filed on Nov. 26, 2014, in the Korean Intellectual Property Office, and entitled: "Rechargeable Battery," is incorporated by reference herein in its entirety.

BACKGROUND

1. Field

The described technology relates to a rechargeable battery, which contains an electrolyte solution within a case.

2. Description of the Related Art

Rechargeable batteries may be charged and discharged, unlike primary batteries. Low-capacity rechargeable batteries may be used for small, portable electronics such as mobile phones, laptop computers, or camcorders, and large-capacity rechargeable batteries may be used for power sources for driving motors of, for example, electric bicycles, scooters, electric vehicles, and forklifts.

SUMMARY

Embodiments may be realized by providing a rechargeable battery, including an electrode assembly performing charging and discharging; a case containing the electrode assembly and an electrolyte solution; a cap plate coupled to an opening of the case to seal the opening and containing more electrolyte solution in a receiving groove on an inner surface thereof; and an insulation case coupled to the receiving groove by a protrusion and located between the electrode assembly and the cap plate.

The cap plate further may include a reinforcing rib on an outer surface thereof.

The receiving groove may open toward the insulation case, and may have a concave flat surface.

The insulation case may be supported by an edge of the cap plate forming an outer periphery of the receiving groove on opposite ends along a length of the cap plate.

The protrusion may be inserted in the receiving groove and attached firmly to the concave flat surface of the receiving groove.

The insulation case may include a first tab hole through which a first electrode lead tab of the electrode assembly passes; and a second tab hole through which a second electrode lead tab of the electrode assembly passes.

The first electrode lead tab may be electrically connected to a flat surface of the receiving groove of the cap plate through the first tab hole, and the second electrode lead tab may be electrically connected through the second tab hole to an electrode terminal and a terminal plate that are installed at the cap plate and insulated from the cap plate.

The insulation case further may include a barrier facing a sidewall of the receiving groove and an inner wall of the case.

The protrusion may be on an edge of the barrier.

A first distance from the flat surface of the receiving groove to the barrier may be shorter than a second distance from the flat surface of the receiving groove to a line connecting the second electrode lead tab and the terminal plate.

The receiving groove may open toward the insulation case, and may have a concave sloping surface.

The insulation case may be supported by an edge of the cap plate forming an outer periphery of the receiving groove on opposite ends along a length of the cap plate, and the protrusion may be inserted in the receiving groove and attached firmly to the concave sloping surface of the receiving groove.

The insulation case may include a first tab hole through which a first electrode lead tab of the electrode assembly passes; and a second tab hole through which a second electrode lead tab of the electrode assembly passes, the first electrode lead tab being electrically connected to a sloping surface of the receiving groove of the cap plate through the first tab hole.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
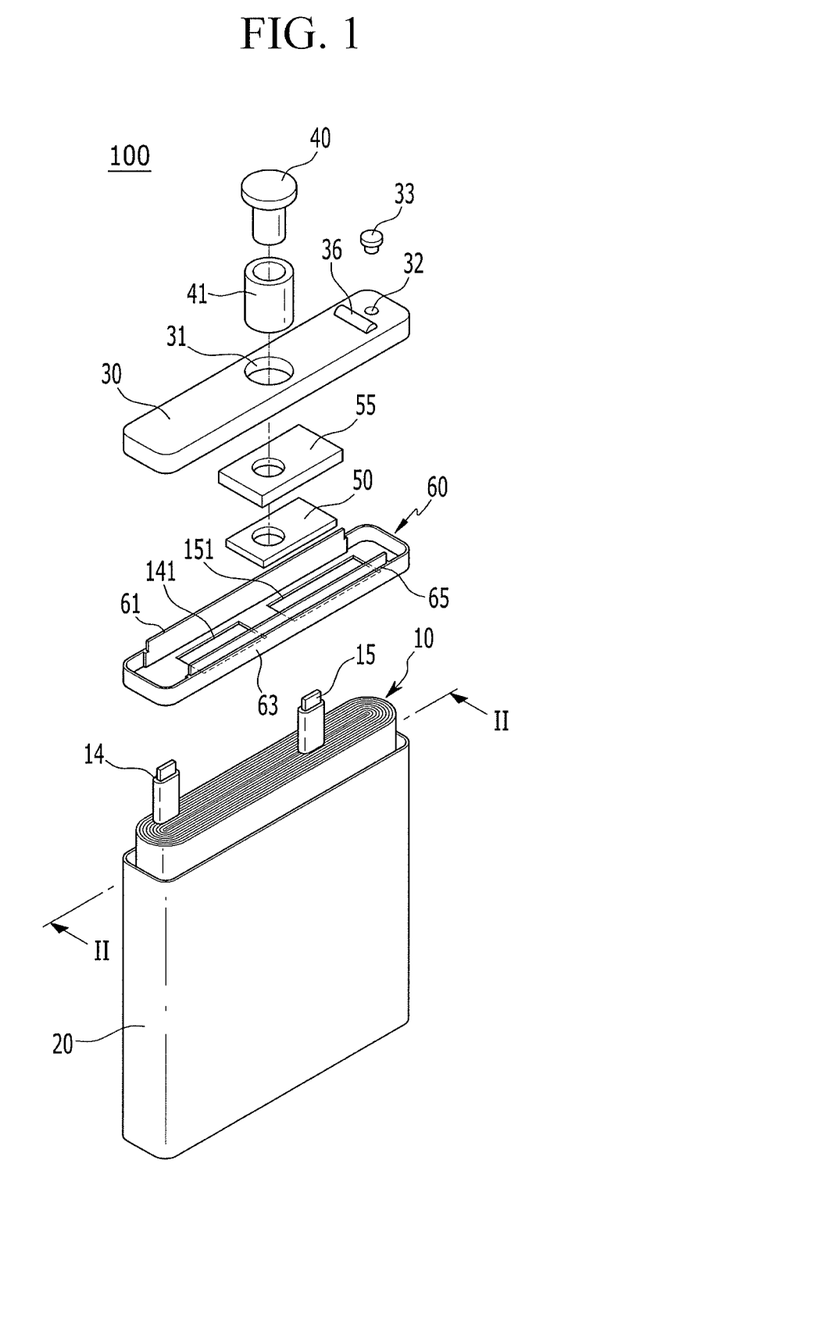
FIG. 1 illustrates an exploded perspective view of a rechargeable battery according to a first exemplary embodiment.
Figure 2:
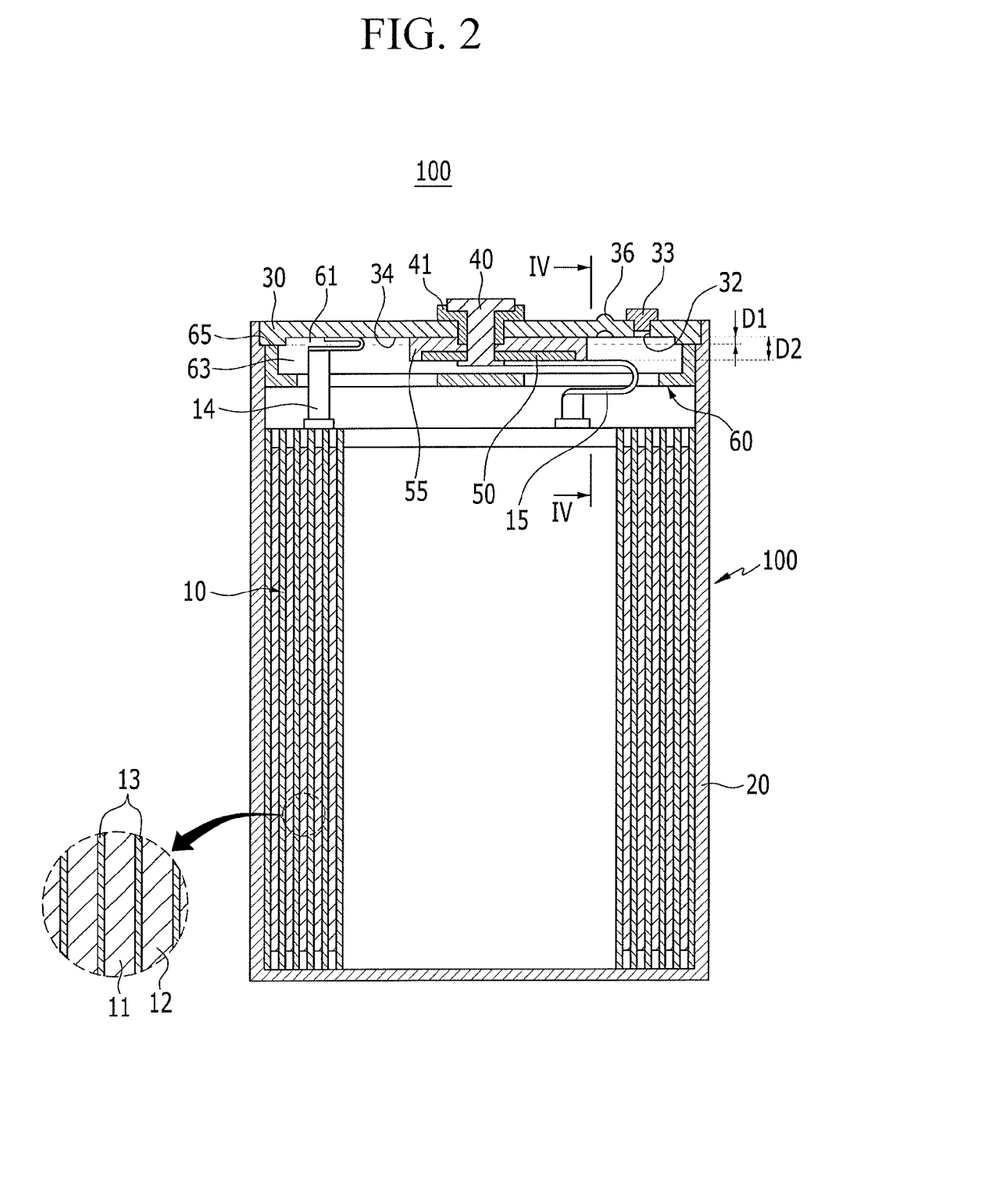
FIG. 2 illustrates a cross-sectional view taken along line II-II of FIG. 1.

FIG. 1 illustrates an exploded perspective view of a rechargeable battery according to a first exemplary embodiment, and FIG. 2 illustrates a cross-sectional view taken along line II-II of FIG. 1. Referring to FIG. 1 and FIG. 2, a rechargeable battery 100 may include an electrode assembly 10 that charges and discharges an electric current, a case 20 that contains the electrode assembly 10 together with an electrolyte solution, a cap plate 30 that is coupled to an opening of the case 20 and seals the opening, and an insulation case 60 located between the electrode assembly 10 and the cap plate 30.

The rechargeable battery 100 may further include an electrode terminal 40 that is fit into a terminal hole 31 and electrically connected to the electrode assembly 10. The electrode assembly 10 may have a shape corresponding to the internal space within the case 20, and the electrode assembly 10 may be inserted into the case 20.

In an example, the electrode assembly 10 may be formed by laminating a first electrode 11 (referred to as "positive electrode" for convenience) and a second electrode 12 (referred to as "negative electrode" for convenience) on both sides of a separator 13, an electric insulator, interposed between them, and winding them in a jelly-roll shape. The electrode assembly 10 may include a first electrode lead tab 14 (referred to as "positive electrode lead tab" for convenience) connected to the positive electrode 11 and a second electrode lead tab 15 (referred to as "negative electrode lead tab" for convenience) connected to the negative electrode 12.

The case 20 may enable insertion of the electrode assembly 10 and the insulation case 60 through the opening at the top. The case 20 may be made of a conductive material, and the case 20 may contain the electrode assembly 10 and an electrolyte solution, together with the cap plate 30 coupled to the opening, and may serve as an electrode terminal. For example, the case 20 may be made of aluminum or an aluminum alloy.

The internal space defined by the case 20 and the cap plate 30 may provide a primary space for containing the electrolyte solution, except for the volume of the electrode assembly 10 and the insulation case 60.

The cap plate 30 may include an electrolyte solution injection port 32 and a receiving groove 34 formed on an inner surface thereof to provide additional space for containing the electrolyte solution in the rechargeable battery 100. The receiving groove 34 may open toward the insulation case 60, and may be flat and concave, e.g., to the outer surface of the cap plate 30.

The receiving groove 34 formed on the inner surface of the cap plate 30 may provide additional space, in addition to a primary space defined in the rechargeable battery 100 to contain the electrolyte solution, and may allow the rechargeable battery 100 to contain more electrolyte solution.

The receiving groove 34 formed on the cap plate 30 may be flat, and may maximize the additional space while minimizing a drop in the strength of the cap plate 30.

The cap plate 30 may further include a reinforcing rib 36 on the outer surface thereof. In an example, the reinforcing rib 36 may be formed to bulge outward from the cap plate 30 as the receiving groove 34 is further recessed, e.g., as a thickness of an upper surface of the cap plate 30 is reduced. The reinforcing rib 36 may reinforce the mechanical strength of the cap plate 30 which may be weakened, for example, due to the receiving groove 34.

Although the first exemplary embodiment illustrates one reinforcing rib 36 extending in the width direction of the cap plate 30, a plurality of reinforcing ribs 36 may extend in the width direction of the cap plate 30. The reinforcing rib 36 may be formed near the electrolyte solution injection port 32 to further make up, e.g., compensate, for a decrease in mechanical strength around the electrolyte solution injection port 32.

The electrolyte solution injection port 32 may enable injection of the electrolyte solution into the case 20 after the cap plate 30 is coupled and welded to the case 20. After injecting the electrolyte solution, the electrolyte solution injection port 32 may be sealed with a sealing cap 33.

The insulation case 60 may be provided between the electrode assembly 10 and a terminal plate 50, within the case 20, to electrically insulate the electrode assembly 10 and the terminal plate 50. For example, the insulation case 60 may electrically insulate the positive electrode 11 of the electrode assembly 10 and the terminal plate 50, which may be positive.

In an example, the insulation case 60 may include first and second tab holes 141 and 151 through which the positive electrode lead tab 14 and the negative electrode lead tab 15 pass respectively. The insulation case 60 may include a protrusion 61 toward the cap plate 30, and may be coupled to the receiving groove 34 of the cap plate 30 by the protrusion 61.

The insulation case 60 may further include a barrier 63 that faces the sidewall of the receiving groove 34 and an inner wall of the case 20. The barrier 63 may separate the space between the insulation case 60 and the cap plate 30 from the sidewall of the receiving groove 34 and the inner wall of the case 20, and the protrusion 61 may be formed on an edge of the barrier 63.

Figure 3:
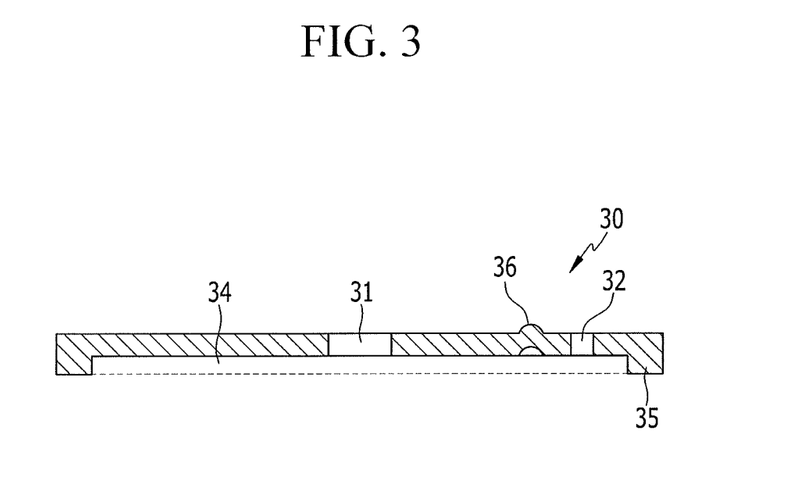
FIG. 3 illustrates a cross-sectional view of the cap plate of FIG. 1.

FIG. 3 illustrates a cross-sectional view of the cap plate of FIG. 1. Referring to FIG. 2 and FIG. 3, the insulation case 60 may be supported by an edge of the cap plate 30 that forms an outer periphery of the receiving groove 34 on both, e.g., opposite, ends (e.g., left and right ends in FIG. 2) along the length of the cap plate 30.

Figure 4:
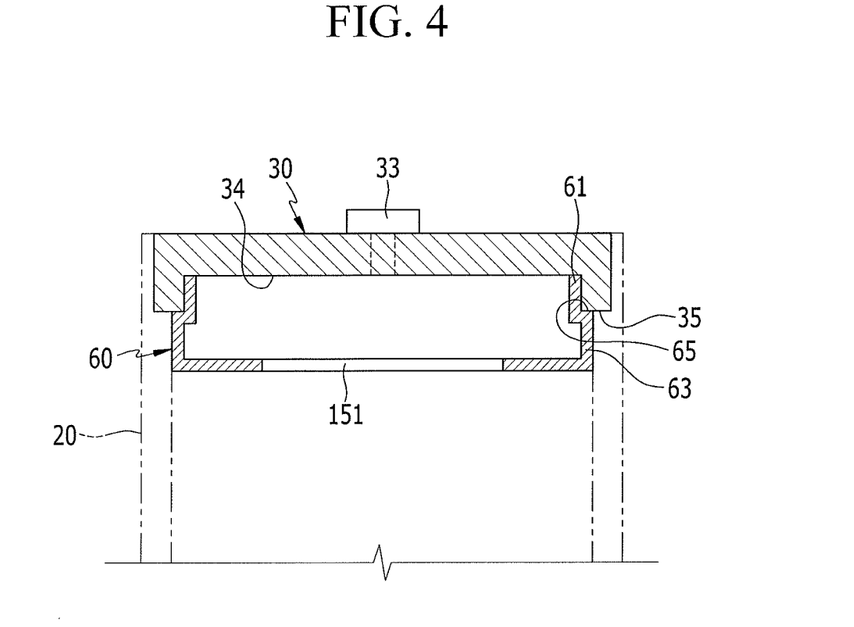
FIG. 4 illustrates a cross-sectional view taken along line IV-IV of FIG. 2.

FIG. 4 illustrates a cross-sectional view taken along line IV-IV of FIG. 2. Referring to FIG. 2 and FIG. 4, the protrusion 61 of the insulation case 60 may be inserted in the receiving groove 34 and attached firmly to the concave flat surface of the receiving groove 34. The insulation case 60 may be further supported on an edge 35 of the cap plate 30 by end portions 65 formed on the outer side of the barrier 63.

With the insulation case 60 being coupled to the receiving groove 34 of the cap plate 30, the positive electrode lead tab 14 may be connected to the receiving groove 34 of the cap plate 30 via the first tab hole 141, and the negative electrode lead tab 15 may be connected to the terminal plate 50 via the second tab hole 151.

The positive electrode lead tab 14 may be connected by welding to the flat surface of the receiving groove 34 of the cap plate 30, and the case 20 may be electrically connected to the positive electrode 11 of the electrode assembly 10 through the cap plate 30 and may work as a positive terminal.

The negative electrode lead tab 15 may be connected by welding to the bottom face of the terminal plate 50 connected to one end of the electrode terminal 40, and the electrode terminal 40 provided in the terminal hole 31 of the cap plate 30 may be electrically connected to the negative electrode 12 of the electrode assembly 10 and may work as a negative terminal.

The negative electrode lead tab may be connected to the cap plate, and may cause the case to work as a negative terminal, and the positive electrode lead tab may be connected to the electrode terminal, and may cause the electrode terminal to work as a positive terminal.

The electrode terminal 40 may be inserted into the terminal hole 31 of the cap plate 30, with an insulation gasket 41 interposed between them. The insulation gasket 41 may electrically insulate the terminal hole 31 and the electrode terminal 40, and may form a sealing structure between the terminal hole 31 and the electrode terminal 40.

The terminal plate 50 may be electrically connected by riveting to the electrode terminal 40, with an insulation plate 55 interposed between them. For example, the insulation plate 55 may electrically insulate the cap plate 30 and the terminal plate 50, and may form another sealing structure between the cap plate 30 and the terminal plate 50.

With the negative electrode lead tab 15 being welded to the terminal plate 50, the protrusion 61 of the insulation case 60 may be coupled to the receiving groove 34 of the cap plate 30. A first distance D1 from the flat surface of the receiving groove 34 to the barrier 63 may be defined, and a second distance D2 from the flat surface of the receiving groove 34 to a line connecting the negative electrode lead tab 15 and the terminal plate 50 may be defined.

The first distance D1 may be shorter than the second distance D2, and a bend of the negative electrode lead tab 15 positioned within the insulation case 60 and the cap plate 30 may be separated and electrically insulated from the sidewall of the receiving groove 34 and the inner wall of the case 20 by means of the barrier 63.

For example, the negative electrode lead tab 15 may be prevented from being exposed out of the insulation case 60 after being welded to the terminal plate 50 and bent, and defects in the rechargeable battery 100, for example, due to exposure of the negative electrode lead tab 15, may be reduced.

A second exemplary embodiment will now be described. Descriptions of the same components as the first exemplary embodiment will be omitted, and only the different components will be described.

Figure 5:
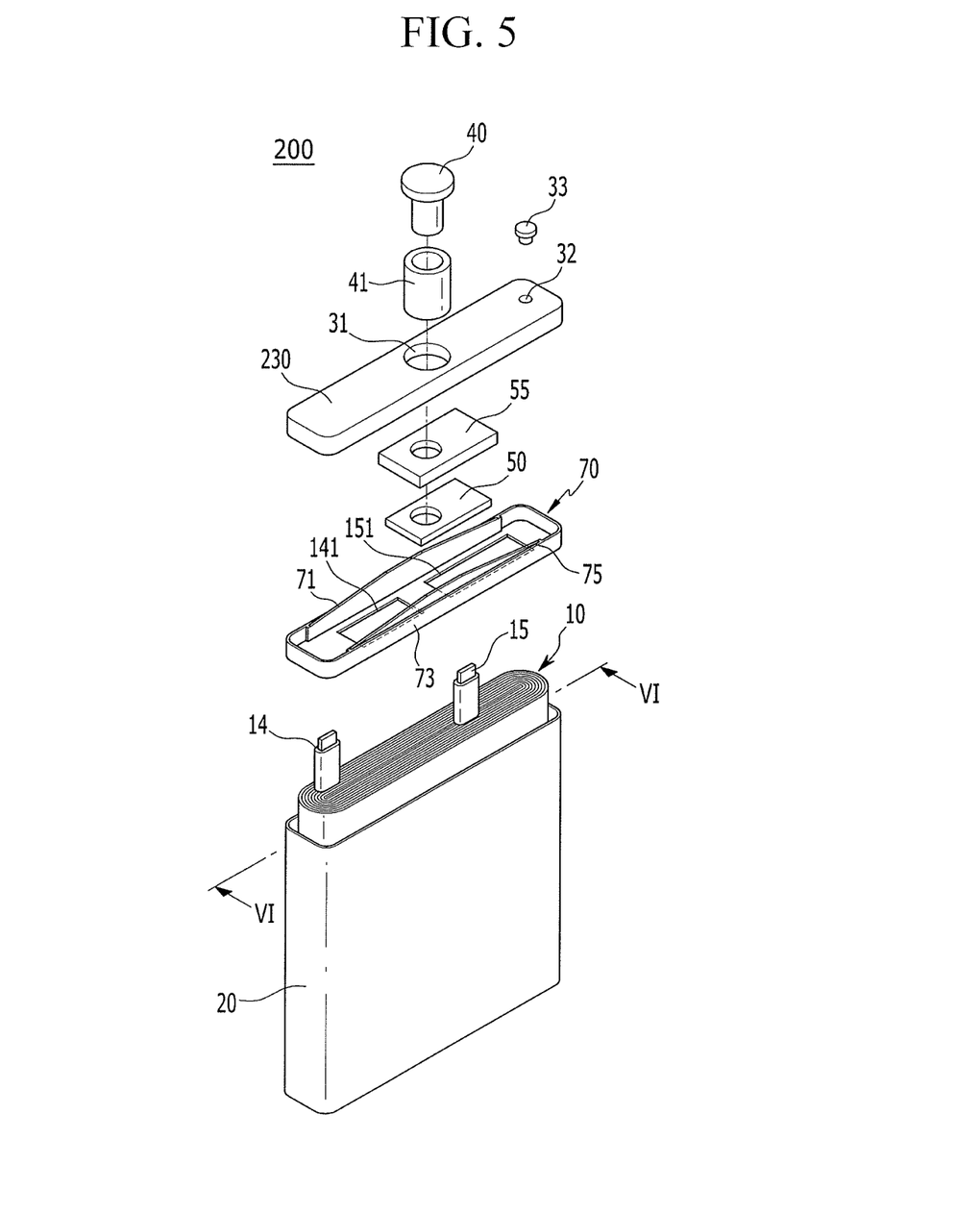
FIG. 5 illustrates an exploded perspective view of a rechargeable battery according to a second exemplary embodiment.
Figure 6:
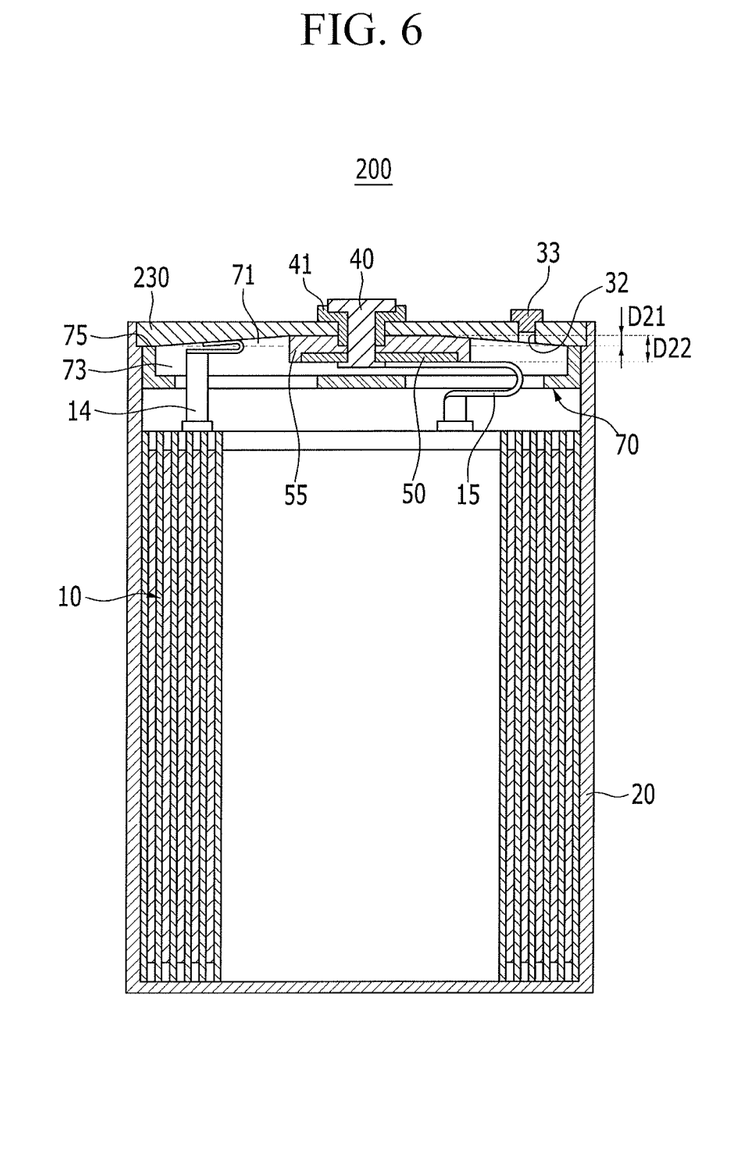
FIG. 6 illustrates a cross-sectional view taken along line VI-VI of FIG. 5.
Figure 7:
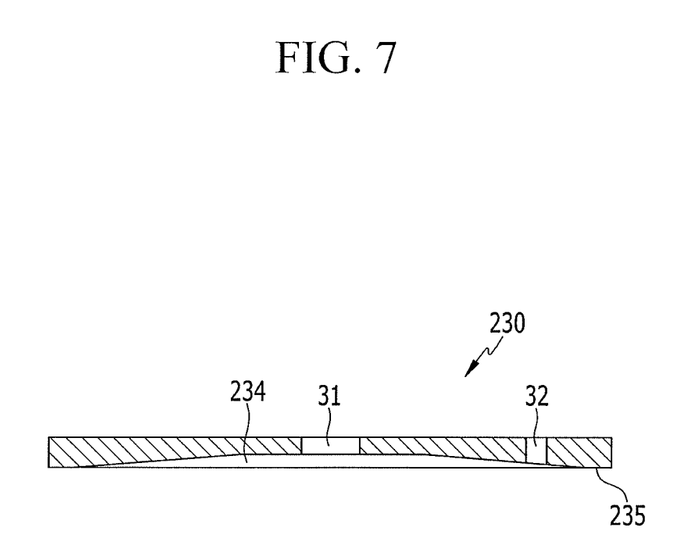
FIG. 7 illustrates a cross-sectional view of the cap plate of FIG. 5.

FIG. 5 illustrates an exploded perspective view of a rechargeable battery according to a second exemplary embodiment, FIG. 6 is a cross-sectional view taken along line VI-VI of FIG. 5, and FIG. 7 is a cross-sectional view of the cap plate of FIG. 5.

Referring to FIG. 5 to FIG. 7, in a rechargeable battery 200 of the second exemplary embodiment, a receiving groove 234 of a cap plate 230 may open toward an insulation case 70, and may be concave, e.g., to the outer surface of the cap plate 230, and may have a sloping surface. A portion of the receiving groove 234 that connects the electrode terminal 40 and the terminal plate 50 may be made flat, and an insulation plate 55 may provide stable insulation and sealing.

The insulation case 70 may include a protrusion 71 toward the cap plate 230, and may be coupled to the receiving groove 234 of the cap plate 230 by the protrusion 71. The protrusion 71 may have a slope to correspond to the sloping surface of the receiving groove 234.

The insulation case 70 may further include a barrier 73 that faces the sidewall of the receiving groove 234 and the inner wall of the case 20. The barrier 73 may separate the space between the insulation case 70 and the cap plate 230 from the sidewall of the receiving groove 234 and the inner wall of the case 20, and the protrusion 71 may be formed on an edge of the barrier 73.

The insulation case 70 may be supported by the edge of the cap plate 230 that forms an outer periphery of the receiving groove 234 on both, e.g., opposite, ends (e.g., left and right ends in FIG. 6) along the length of the cap plate 230.

The protrusion 71 of the insulation case 70 may be inserted in the receiving groove 234 and attached firmly to the concave sloping surface of the receiving groove 234. The insulation case 70 may be further supported on the edge 235 of the cap plate 230 by end portions 75 formed on the outer side of the barrier 73.

With the insulation case 70 being coupled to the receiving groove 234 of the cap plate 230, a positive electrode lead tab 14 may be connected to the receiving groove 234 of the cap plate 230 via a first tab hole 141, and a negative electrode lead tab 15 may be connected to the terminal plate 50 via a second tab hole 151.

The positive electrode lead tab 14 may be connected by welding to the sloping surface of the receiving groove 234 of the cap plate 230, and the case 20 may be electrically connected to the positive electrode 11 of the electrode assembly 10 through the cap plate 230 and may work as a positive terminal.

With the negative electrode lead tab 15 being welded to the terminal plate 50, the protrusion 71 of the insulation case 70 may be coupled to the receiving groove 234 of the cap plate 230. The insulation plate 55 may extend to the sloping surface of the receiving groove 234, and may insulate and support the negative electrode lead tab 15.

A first distance D21 from the sloping surface of the receiving groove 234 to the tip of the protrusion 71 may be defined, and a second distance D22 from the sloping surface of the receiving groove 234 to a line connecting the negative electrode lead tab 15 and the terminal plate 50 may be defined.

The first distance D21 may be shorter than the second distance D22, and a bend of the negative electrode lead tab 15 positioned within the insulation case 70 and the cap plate 230 may be be separated and electrically insulated from the sidewall of the receiving groove 234 and the inner wall of the case 20.

For example, the negative electrode lead tab 15 may be prevented from being exposed out of the insulation case 70 after being welded to the terminal plate 50 and bent, and defects in the rechargeable battery 200, for example, due to exposure of the negative electrode lead tab 15, may be reduced.

By way of summation and review, a rechargeable battery may include an electrode assembly that performs charging and discharging, a case that contains the electrode assembly, and a cap plate that seals an opening of the case and has an electrode terminal outside the case in electrical communication with the electrode assembly.

The cap plate my have an electrolyte solution injection port for injecting an electrolyte solution into the case, and the electrolyte solution injection port may be sealed with a sealing cap. The rechargeable battery may require a large amount of electrolyte solution for improvement in battery life.

The rechargeable battery may offer additional space within the case by reducing the thickness of the case and the size of dimples on the case. For example, the additional space within the case may allow for more space for the electrolyte solution. A reduction in the thickness of the case and the dimples on the case, caused by the additional space, may weaken the resistance of the case to internal gas pressure generated within the case during charge or discharge.

According to an embodiment, a rechargeable battery may offer additional space for containing more electrolyte solution, in addition to an internal space defined by a case and a cap plate, by forming a receiving groove on the cap plate, providing an insulation case between an electrode assembly and the cap plate, and coupling the insulation case to the receiving groove by a protrusion.

As more electrolyte solution may be contained, the life of the rechargeable battery may be improved, and at the same time the case may be kept highly resistive to damage even under the pressure of internal gas generated within the case during charge or discharge.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly performing charging and discharging;
   a case containing the electrode assembly and an electrolyte solution;
   a cap plate coupled to an opening of the case to seal the opening and containing more electrolyte solution in a receiving groove on an inner surface thereof; and
   an insulation case coupled to the receiving groove by a protrusion and located between the electrode assembly and the cap plate, wherein
   the insulation case includes:
      a first tab hole through which a first electrode lead tab of the electrode assembly passes; and
      a second tab hole through which a second electrode lead tab of the electrode assembly passes, wherein:
   the first electrode lead tab is electrically connected to a flat surface of the receiving groove of the cap plate through the first tab hole, and
   the second electrode lead tab is electrically connected through the second tab hole to an electrode terminal and a terminal plate that are installed at the cap plate and insulated from the cap plate, wherein
   the insulation case further includes a barrier facing a sidewall of the receiving groove and an inner wall of the case, wherein
   the protrusion is on an edge of the barrier, and wherein
   a first distance from the flat surface of the receiving groove to the barrier is shorter than a second distance from the flat surface of the receiving groove to a line connecting the second electrode lead tab and the terminal plate.

2. The rechargeable battery as claimed in claim 1, wherein the cap plate further includes a reinforcing rib on an outer surface thereof.

3. The rechargeable battery as claimed in claim 1, wherein the receiving groove opens toward the insulation case, and has a concave flat surface.

4. The rechargeable battery as claimed in claim 3, wherein the insulation case is supported by an edge of the cap plate forming an outer periphery of the receiving groove on opposite ends along a length of the cap plate.

5. The rechargeable battery as claimed in claim 4, wherein the protrusion is inserted in the receiving groove and attached firmly to the concave flat surface of the receiving groove.

6. The rechargeable battery as claimed in claim 1, wherein the receiving groove opens toward the insulation case, and has a concave sloping surface.

7. The rechargeable battery as claimed in claim 6, wherein:
   the insulation case is supported by an edge of the cap plate forming an outer periphery of the receiving groove on opposite ends along a length of the cap plate, and
   the protrusion is inserted in the receiving groove and attached firmly to the concave sloping surface of the receiving groove.

8. The rechargeable battery as claimed in claim 1, wherein the insulation case includes:
   a first tab hole through which a first electrode lead tab of the electrode assembly passes; and
   a second tab hole through which a second electrode lead tab of the electrode assembly passes,
   the first electrode lead tab being electrically connected to a sloping surface of the receiving groove of the cap plate through the first tab hole.

* * * * *